(12) United States Patent
Cizek et al.

(10) Patent No.: US 6,511,613 B1
(45) Date of Patent: Jan. 28, 2003

(54) CORROSION INHIBITOR

(75) Inventors: Arthur Cizek, Houston, TX (US); James A. Hackerott, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/178,445

(22) Filed: Jun. 21, 2002

Related U.S. Application Data

(62) Division of application No. 09/548,837, filed on Apr. 13, 2000.

(51) Int. Cl.$^7$ ............................................. C23F 11/04
(52) U.S. Cl. ..................... 252/396; 252/388; 507/266; 510/258; 510/267; 134/3; 134/22.14; 134/22.19; 422/12; 106/14.13
(58) Field of Search .............................. 252/389.1, 388, 252/387, 399, 396, 400.1; 507/266; 510/258, 267; 570/189, 234, 252, 101; 422/7, 12; 134/3, 22.14, 22.19, 14.13

(56) References Cited

U.S. PATENT DOCUMENTS

| | | |
|---|---|---|
| 2,989,568 A | 6/1961 | Russell et al. |
| 3,077,454 A | 2/1963 | Monroe et al. |
| 3,686,129 A | 8/1972 | Loucks |
| 3,773,465 A | 11/1973 | Keeney et al. |
| 3,773,645 A | 11/1973 | Nees et al. |
| 3,816,322 A | 6/1974 | Griffin et al. |
| 3,859,362 A | 1/1975 | Sekizawa et al. |
| 3,932,668 A | 1/1976 | Sekizawa et al. |
| 4,444,668 A | 4/1984 | Walker et al. |
| 4,614,600 A | 9/1986 | Schilling et al. |
| 4,647,572 A | 3/1987 | Inouye et al. |
| 4,778,617 A | 10/1988 | Shaer et al. |
| 4,780,150 A | 10/1988 | Anderson et al. |
| 4,851,149 A | 7/1989 | Carandang |
| 4,871,024 A | 10/1989 | Cizek |
| 4,997,040 A | 3/1991 | Cizek |
| 5,360,488 A | 11/1994 | Hieatt et al. |
| 5,543,388 A | 8/1996 | Williams et al. |
| 5,693,849 A | 12/1997 | Nowak |

FOREIGN PATENT DOCUMENTS

| | | |
|---|---|---|
| EP | 0 192 130 B1 | 8/1986 |
| EP | 0 2769 879 A1 | 8/1988 |
| EP | 0 638 663 A2 | 2/1995 |

OTHER PUBLICATIONS

N. Hackerman, et al., "Effects of Anions on Corrosion Inhibition by Organic Compounds," Journal of the Electrochemical Society, vol. 113, No. 7, Jul. 1966, pp. 677–681.
Chemical Abstracts 74:15014w, 1974.
Chemical Abstracts 74:150149x, 1974.
Chemical Abstracts 89:81931s, 1989.
M. Bartos, et al., "A Study of Inhibition Action of Propargyl Alcohol during Anodic Dissolution of Iron in Hydrochloric Acid," Journal of the Electrochemical Society, vol. 139, No. 12, Dec. 1992, pp. 3428–3433.
A. Cizek, "A Review of Corrosion Inhibitors Used in Acidizing," Materials Performance, vol. 33, No. 1, Jan. 1994, pp. 56–61.
Y. Feng, et al., "The Synergistic Efects of Propargyl Alcohol and Potassium Iodide on the Inhibition of Mild Steel in 0.5 M Sulfuric Acid Solution," Corrosion Science, vol. 41, 1999, pp. 829–852.
PCT International Search Report for International Application No. PCT/US01/11299, May 3, 2002.

*Primary Examiner*—Joseph D. Anthony
(74) *Attorney, Agent, or Firm*—Madan, Mossman & Sriram, P.C.

(57) ABSTRACT

The reaction of propargyl alcohol and iodine gives 2,3-diiodo-2-propen-1-ol, and it has been discovered that this compound is effective as an intermediate in a corrosion inhibitor for metals in acid media, particularly halogen acids. The compound provides iodine to the media in a stable form that does not appear to degrade over time.

11 Claims, No Drawings

CORROSION INHIBITOR

This application is a division of application Ser. No. 09/548,837, filed Apr. 13, 2000.

FIELD OF THE INVENTION

The invention relates to methods and compositions for inhibiting corrosion of metals, and, in one aspect, more particularly relates to methods and compositions for inhibiting corrosion of metals in acid environments where the acid contains halogen, such as hydrochloric acid, hydrofluoric acid, and the like.

BACKGROUND OF THE INVENTION

It is well known that steel surfaces will corrode in the presence of acid environments. While the rate at which corrosion will occur depends on a number of factors, such as the steel alloy itself, the strength and type of acid, the temperature of the environment, the length of contact, etc., some sort of corrosion invariably occurs. Alloy technology has provided materials to withstand the incidental contact of steel with add, but the corrosion problem is particularly aggravated when there is no choice but to contact steel with acid, as in the case of chemical processing where acids are employed. In instances where acid is not required to remain pure and where the contact is inevitable, attention has turned toward providing corrosion inhibitors in the acid medium itself to prevent corrosion of the steel surfaces that it must come into contact with, yet still deliver the acid to its ultimate destination. It would be advantageous if a new corrosion inhibitor were discovered that would be an improvement over the presently known systems. For example, a corrosion inhibitor providing a large corrosion inhibiting effect for a small proportion used would be advantageous.

A specific environment in which an improved corrosion inhibitor would be appreciated is in the oil patch. It is well known that during the production life of an oil or gas well, the production zone within the well may be chemically treated or otherwise stimulated to enhance the economical production lifetime of the well. A common way of doing this is by acid fracturing or matrix acidizing, whereby a highly acidic solution, generally having a pH of less than about 1, but which may be as high as about 6.9 is injected into the well. Spent acid in return fluids may have a pH of around 3–6.9, and organic acids used in acidizing include formic acid and acetic acid, each of which have a pH below 6.9. Because of the acidic nature of the treatment fluid, the production or workover conduit which is utilized in the well in such applications encounters considerable acidic corrosion, in the forms of surface pitting, embrittlement, loss of metal component and the like.

In earlier years of producing subterranean wells, the vast majority of production and workover conduits comprised carbon steels; they were utilized either temporarily or permanently in the well, and treatment and/or stimulation fluids were introduced through them into the well. Recently, due primarily to the drilling and completion of many subterranean wells through formations which contain high concentrations of corrosive fluids such as hydrogen sulfide, carbon dioxide, brine, and combinations of these constituents, the production and workover conduits for use in the wells have been made of high alloy steels. The high alloy steels include chrome steels, duplex steels, stainless steels, martensitic alloy steels, ferritic alloy steels, austenitic stainless steels, precipitation-hardened stainless steels, high nickel content steels, and the like.

Corrosion inhibitors containing iodine and other halogens are known. For example, U.S. Pat. No. 2,989,568 relates to the preparation of halogenated acetylenic alcohols containing chlorine or bromine. Such compounds are described as useful as corrosion stabilizers for chlorinated solvents such as trichloroethylene and as inhibitors in plating baths.

The effects of inorganic anions, organic compounds, and combinations of the two on corrosion of mild steel in various acids were determined by N. Hackerman, et al. as described in "Effects of Anions on Corrosion Inhibition by Organic Compounds," *Journal of the Electrochemical Society*, Vol. 113, No. 7, July 1966, pp. 677–81. From corrosion rates of steel in adds, the order of the degree of adsorption of anions was concluded to be: $I^->Br^->Cl^->SO_4=>ClO_4^-$.

U.S. Pat. No. 3,686,129 mentions that hydrogen embrittlement which normally occurs when high strength metal parts are immersed in acid-cleaning solution, is minimized or eliminated by adding certain combinations of (1) mono-alkynols and (2) iodine compounds which are either iodo-alkenols or suppliers of iodide ion.

Inhibited treating acids for use in contact with ferrous surfaces at temperatures of from about 150° F. to about 450° F. are described in U.S. Pat. No. 3,773,465. Cuprous iodide is present in a concentration of from about 25 ppm to about 25,000 ppm by weight of the treating acid.

U.S. Pat. No. 3,816,322 describes that iron surfaces are protected against corrosion by aqueous acidic solutions containing a polyhydric compound or derivative thereof by dispersing into the corrosive solution which will contact the metal surface an effective amount of a heterocyclic amine, an acetylenic alcohol, and an ionizable iodine containing compound.

There remains a need for new, stable corrosion inhibitors and methods therefor which would work in halogen acid environments for a wide variety of steels. For example, iodine alone formulated with conventional corrosion inhibitor ingredients can enhance halogen acid corrosion control primarily of chrome steels, but also carbon steels. However, with time, iodine corrosion inhibitors tend to become less effective. In one non-limiting theory, it is believed that the iodine slowly reacts with organic materials, or at least the organic materials are the cause for formulation degradation.

SUMMARY OF THE INVENTION

Accordingly, it is an object of the present invention to provide compositions of matter effective in the inhibition of corrosion in halogen acid environments.

It is another object of the present invention to provide compositions for minimizing corrosion in halogen acid situations, which compositions may be easily made.

It is yet another object of the invention to provide methods and compositions for suppressing the corrosion of steels in halogen acid environments which can be readily implemented using conventional equipment.

Still another object of the invention is to provide an iodine-containing halogen acid corrosion inhibitor which is stable over time.

In carrying out these and other objects of the invention, there is provided, in one form, a method for inhibiting the corrosion of metals in contact with an acidic liquid medium which involves providing a liquid medium containing an acid, and then adding to the liquid medium an effective amount of a corrosion inhibitor comprising a reaction product of iodine and propargyl alcohol. Other ingredients may be added, of course.

DETAILED DESCRIPTION OF THE INVENTION

It has been discovered that the reaction product of iodine in an excess of pargyl alcohol gives compound (I):

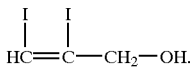
(I)

That is, 2,3di-iodo-2-propen-1-ol in propargyl alcohol. The resulting product is propargyl alcohol white and it is acid soluble. As will be shown, it is a useful ingredient used to prepare a halogen acid corrosion inhibitors, and mixed halogen acid/organic acid corrosion inhibitors, such as combinations of acetic acid and HF, and/or formic acid/HF. The halogen acid environments where the invention is useful encompass acid environments where the acid includes, but is not limited to, hydrochloric acid, hydrofluoric acid, formic acid, acetic acid, and mixtures thereof. Intermediate compound (I) has been found to have excellent stability, thus avoiding degradation over time. Compound (I) is an intermediate which is used in an inhibitor composition.

In one preferred embodiment of the invention the intermediate corrosion inhibitor (I) is made by reacting from about 6 parts by weight of propargyl alcohol to about 1 part by weight of iodine. In a broad range, the weight ratio range of propargyl alcohol to iodine is from about 1.1:1 to about 12:1. In a preferred embodiment of the invention, the weight ratio range of propargyl alcohol to iodine is from about 6:1 to about 4:1.5. It will be appreciated that the iodine reactant is relatively expensive, and it is thus desirable to minimize its proportion. The temperature for this reaction may range from about ambient to 140° C. No catalyst is required.

The acid corrosion inhibitor intermediate to be combined with the acidic injection medium and the intensifier can be any acetylenic compound such as acetylenic alcohol; a nitrogen compound, such as a quaternary ammonium compound; and aromatic hydrocarbon or mixtures thereof, as is known to those skilled in the art. For example, acid corrosion inhibitors as made and described in U.S. Pat. Nos. 3,514,410; 3,404,094; 3,107,221; 2,993,863; and 3,382,179; may be utilized in accordance with the present invention.

Examples of acetylenic compounds which may be used include hexynol, dimethyl hexynol, diethyl hexynediol, dimethyl hexynediol, dimethyl octynediol, methyl butynol, methyl pentynol, ethynyl cyclohexynol, 2-ethyl hexynol, phenyl butynol, and ditertiary acetylenic glycol.

Other acetylenic compounds which can be employed in accordance with the present invention include, but are not limited to, butynediol; 1-ethynyl-cyclohexanol; 3-methyl-1-nonyn-3ol; 2-methyl-3-butyn-2-ol; also 1-propyn-3ol; 1-butyn-3-ol; 1-pentyn-3-ol; 1-heptyn-3-ol; 1-octyn-3-ol; 1-nonyn-3-ol; 1-decyn-3-ol; 1-(2,4,6-trimethyl-3-cyclohexenyl)-3-propyne-1-ol; and in general acetylenic compounds having the general formula:

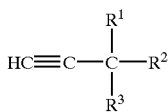

wherein $R^1$ is —H, —OH, or an alkyl radical; $R^2$ is —H, or an alkyl, phenyl, substituted phenyl or hydroxyalkyl radical; and $R^3$ is —H or an alkyl, phenyl, substituted phenyl or hydroxyalkyl radical.

Acetylenic sulfides having the general formula:

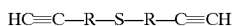

can also be employed in the present invention in lieu of acetylenic alcohols. Examples of these are dipropargyl sulfide, bis-(1-methyl-2-propynyl)sulfide and bis-(2-ethynyl-2-propyl)sulfide.

The nitrogen or ammonia compounds can be optionally employed in accordance with the present invention, and they may include, but are not limited to, those amines having from 1 to twenty-four carbon atoms in each alkyl moiety as well as the six-membered heterocyclic amines, for example, alkyl pyridines, crude quinolines and mixtures thereof. This includes such amines as ethylamine, diethylamine, triethylamine, propylamine, dipropyl-amine, tripropylamine, mono-, di- and tripentylamine, mono-, di- and trihexylamine and isomers of these such as isopropylamine, tertiary-butylamine, etc. This also includes alkyl pyridines having from one to five nuclear alkyl substituents per pyridine moiety, such alkyl substituents having from one to 12 carbon atoms, and preferably those having an average of six carbon atoms per pyridine moiety, such as a mixture of high boiling tertiary-nitrogen-heterocyclic compounds, such as HAP (high alkyl pyridines), Reilly 10–20 base and alkyl pyridines H3. Other nitrogen compounds include the crude quinolines having a variety of substituents.

The inhibitor may also contain a number of other constituents, such as nonyl phenol adducts and tallow amine adducts, tall oil adducts, such as surfactants. Components such as heavy aromatic solvents and fatty acids, may also be present as oils for oil wetting. Surfactants also aid in oil wetting.

A necessary component of the treatment fluid of the present invention is the iodine/propargyl alcohol reaction product (I), previously described. The proportion of the reaction product is in excess of propargyl alcohol present per se. The overall corrosion inhibitor formulation may contain from about 1 to about 100 pbw or wt. % iodine/propargyl alcohol reaction product (I), preferably from about 2 to about 25 pbw or wt. %, and most preferably from about 3 to about 10 pbw or wt. %.

It will be appreciated that the halogen acid corrosion inhibitor of this invention may be used with conventional corrosion inhibitors such as those described below, in any application where a steel surface, such as stainless steel, high alloy or other steel, is exposed to an acid environment. While the specific implementation of this invention is described in the context of the oil patch, the invention may certainly find uses in other applications where it is desirable to reduce corrosion, such as chemical processes that necessarily require the contact of acids with conduits, fittings, and other equipment.

In the implementation of the invention in the production of fluids from subterranean reservoirs, a fluid is introduced through a high alloy steel member or conduit positioned within the well. The fluid is an acidic injection medium and includes an acid corrosion inhibitor. The invention also encompasses a method of treating a well for enhancement of production within a production zone by introduction into the steel conduit of the acid corrosion inhibitor composition of this invention.

The fluid which is contemplated for use in one aspect of the present invention for treatment of a subterranean well for enhancement of production will be aqueous based; that is, it will be formed using sea water available at the well location, a brine, tap water or similar fluid. The amount of fluid used for the treatment will vary, of course, from well to well, and will be based upon the particular application at hand, and the amount thereof is not particularly critical to the method of the present invention. It will be appreciated that one of ordinary skill in the art of corrosion inhibition will be able to adapt the teachings of this invention to applications outside the realm of oil and gas recovery, such as the area of chemical processing, with only routine experimentation.

The expected treatment fluid in an oil production environment is expected to have as a primary additive an acidic injection medium which may be any compatible acid, including but not limited to hydrochloric acid, hydrofluoric acid, formic acid, acetic acid, and mixtures thereof. The fluid with the acid injection medium therein should have a pH of no greater than about 6.9. Acidizing fluids have pH of less than 1 when mixed with produced fluids which may have a pH as high as 6.9.

The treatment fluid also contemplates incorporation of other acid corrosion inhibitors which typically will be provided in treatment concentrations of from about 1,000 ppm, based upon the weight of the entire treatment fluid to about 60,000 ppm of such weight. Most often, the total amount of corrosion inhibitors will range from about 1,000 to 20,000 ppm including any intensifier, if present. Formic acid is an intensifier and can be used at concentrations up to 100,000 ppm or more. Again, the treatment level of the acid corrosion inhibitor will vary depending upon the particular physical characteristics of the well, the high alloy steel conduit, temperature and pressure considerations, the selected acidic injection medium, and the like.

It will be appreciated that the treatment level of the acid corrosion inhibitor of this invention will vary depending upon a wide variety of parameters including, but not limited to, the particular physical characteristics of the system or well, the nature of the steel, temperature and pressure considerations, the acid and strength thereof in the system, and the like. Nevertheless, to give a sense of the typical proportions that might be used, non-limiting effective amounts of reaction product in the corrosion inhibitor ranges from about 1 to about 20 gpt (gallons of inhibitor per thousand gallons of acid), depending on the acid strength. The treatment level also depends upon the temperature and exposure time, with the following being non-limiting, representative examples:

- 1–3 gpt at ambient to 200° F. in 15% HCl and 6 hours exposure;
- 1–5 gpt at ambient to 200° F. in 28% HCl and 6 hours exposure;
- 3–10 gpt at 200 to 250° F. in 15% HCl and 6 hours exposure; and
- 5–15 gpt at 200 to 250° F. in 28% HCl and 6 hours exposure.

Twenty (20) gpt of corrosion inhibitor plus intensifiers is commonly used in acid systems at or above 250° F. Intensifiers are ingredients that extend inhibition of the inhibitor. Common intensifiers include, but are not necessarily limited to $Cu_2I_2$, KI, formic acid, and the like. Intensifiers are not corrosion inhibitors themselves.

The invention will be described further in the following illustrative Examples, which are non-limiting and serve only to further teach the invention.

COMPOUNDS A–I

Preparations

Compounds A–D, F and J were heated and mixed on a hot plate that had a 135–145° F. surface temperature. Heating and mixing times are reported for Compounds A, B, D, and F; Compounds C and J were heated for a short time, less than 15 minutes. The ingredients were in a capped 1 oz. bottle containing a magnetic stirrer. Compound E was prepared similarly, but without heating.

Compound A turned from iodine black to propargyl alcohol white after 5 minutes. It was heated and mixed for 2 hours.

Compound B was iodine black from start to finish and was heated and mixed for 5 hours.

Compound C was iodine black and turned clear.

Compound D was iodine black from start to finish and was heated and mixed for 2 hours, and mixed for approximately 5 hours.

Compound E was iodine black from start to finish.

Compound F was iodine black from start to finish and was heated and mixed for 4.5 hours.

It was concluded that the iodine was reacting with propargyl alcohol and not with methanol, the linear alcohol blends or the proprietary linear alphaolefin blend.

The preparation for Compound J was the same as for Compound A, except that it took 15 minutes of heating and mixing to go from iodine black to propargyl alcohol white. It was heated for 15 minutes and hand shaken.

Compounds G, H, and I are corrosion inhibitor candidates.

Compound J is composed of 18 parts propargyl alcohol and 3 parts iodine (6:1 ratio). The mixture was warmed from room temperature to 135° F. and shaken by hand every five minutes for a 15 minute period at which time the composition was clear indicating reaction. This material was analyzed and found to contain 2,3-di-iodo-2-propen-1-ol as a reaction product.

The preparations of Compounds A-J are summarized in Table I. Inventive compounds are A, C, G, H, I, and J. The indicated amounts of alcohol or hydroxyl-containing component and iodine were mixed together as indicated for the shown time periods in Table I. If the mixture was heated, the temperature is indicated.

TABLE I

Preparation of Iodine-Containing Products

| Ingredients (pbw) | A | B | C | D | E | F | G | H | I | J |
|---|---|---|---|---|---|---|---|---|---|---|
| Mannich Base | — | — | — | — | — | — | 25 | 25 | 25 | — |
| Proprietary blend of alkoxylated $C_{14-15}$ linear alcohols | — | — | — | 15 | 15 | — | 15 | 15 | 15 | — |
| Proprietary fatty acid | — | — | — | — | — | 3 | 3 | 3 | — | — |
| Proprietary blend of linear $C_{10-14}$ alpha-olefins | — | — | — | — | — | 4 | 4 | 4 | — | — |
| MeOH | — | 46 | 46 | — | 46 | — | 46 | — | 46 | — |
| Propargyl alcohol | 6 | — | 6 | — | — | — | — | 6 | 6 | 18 |
| Iodine | 1 | 1 | 1 | 1 | 1 | 1 | — | — | — | 3 |
| Compound A | — | — | — | — | — | — | 7 | — | — | — |
| Compound B | — | — | — | — | — | — | — | 47 | — | — |
| Compound F | — | — | — | — | — | — | — | — | 8 | — |
| Heat & Mixing (hrs) | 2 | 5 | | 5 | | 4.5 | | | | |

Additional Compounds K through N were prepared similarly to Compounds A–J as summarized in Table II, below. Compounds L and N were heated and mixed similarly to Compound H. Compounds K, L, and N are inventive.

TABLE II

EXAMPLES K–N: Preparation of Products

| Ingredients (pbw) | K | L | M | N |
|---|---|---|---|---|
| Mannich Base | 25 | — | 25 | — |
| OX 781 | — | — | 25 | — |
| Proprietary blend of alkoxylated $C_{14-15}$ linear alcohols | 15 | — | — | — |
| Proprietary fatty acid | 3 | — | — | — |
| Heavy aromatic solvent | — | — | 5 | — |
| Proprietary blend of linear $C_{10}$–$C_{14}$ alpha-olefins | 4 | — | 1 | — |
| MeOH | 46 | — | 38 | — |
| Propargyl alcohol | — | 12 | 6 | 4 |
| Iodine | — | 3 | — | 1.5 |
| Compound J | 7 | — | — | — |

Corrosion Inhibition

The following Examples 1–12 demonstrate that the iodine-containing products prepared above are effective as corrosion inhibitors in aqueous halogen acid solutions. Results are summarized in Tables IIIA and IIIB.

Procedure

To 100 ml of acid in a 4 oz. round bottle (test cell) were added 10 gpt of the indicated corrosion inhibitor and either 0 or 0.2 g formic acid intensifier, which were mixed and the pre-weighed coupon (test specimen). KI may also be used as an intensifier. Formic acid is a preferred intensifier for this invention. The test cell is placed in a rack, which is capable of holding 15 cells, and the rack is immersed into a pre-heated (150–170° F.) mineral seal oil present in the autoclave. The autoclave is sealed, pressured and heated to the desired test pressure and temperature. The pressure was bled off at about 4600 psi. The test rack is agitated by an oscillating motion. Alternatively, the test may have been run under atmospheric pressure at $\leq 200°$ F. using a hot water bath for temperature control.

TABLE IIIA

EXAMPLES 1–6
Demonstration of Corrosion Inhibition Effect
6 hours at 250° F.; 100 ml test solution; mineral seal oil; the hydraulic fluid used to pressurize the autoclave to 4000 psig; formic acid at 10 GPT was used as an intensifier; the acid was 15% HCl

| Ex. No. | Compound | Conc. GPT | Steel | Wt. Loss, lb/ft$^2$ | Remarks |
|---|---|---|---|---|---|
| 1 | G | 10 | J-55 | 0.060 | 4 |
| 2 | " | 10 | Cr13 | 0.027 | 4 |
| 3 | H | 10 | J-55 | 0.022 | 4 |
| 4 | " | 10 | Cr13 | 0.019 | 2 |
| 5 | I | 10 | J-55 | 0.021 | 4 |
| 6 | " | 10 | Cr13 | 0.020 | 2 |

Remarks codes for visual appearance after the test:

0—coupon looks like it never was in acid; excellent

1—clean and bright; excellent

2—some smudge spots or discoloration; excellent

3—some pitting on the cut surface only; acceptable

4–9—varying amounts of pitting on the major surface; unacceptable

TABLE IIIB

EXAMPLES 7–12
Demonstration of Corrosion Inhibition Effect
6 hours at 200° F. (coupons put in acid at room temperature);
100 ml test solution; atmospheric pressure; no intensifier;
the acid was 28% HCl; the Compound was used at a level of 8 GPT

| Ex. No. | Compound | Steel | Wt. Loss, lb/ft$^2$ | Remarks |
|---|---|---|---|---|
| 7 | G | J-55 | 0.011 | 1 |
| 8 | " | Cr13 | 0.026 | 2 |
| 9 | H | J-55 | 0.018 | 1 |
| 10 | " | Cr13 | 0.072 | 4 |
| 11 | I | J-55 | 0.025 | 1 |
| 12 | " | Cr13 | 0.103 | 4 |

Examples 1–12 of Tables IIIA and IIIB demonstrate that these inventive formulations have a corrosion inhibition effect.

5 COMPOUNDS 2A–2e$_1$

The indicated amounts of alcohol or hydroxyl-containing component and iodine were mixed together, similarly to Compounds A–N. Compounds

TABLE IV

Preparation of Propargyl Alcohol-Containing Products

| Ingredients (pbw) | 2A | 2B | 2C | 2D | 2E | 2F | 2G | 2H | 2I | 2J | 2K | 2L |
|---|---|---|---|---|---|---|---|---|---|---|---|---|
| Mannich Base | 24 | 24 | 24 | 23 | 23 | 23 | 22 | 22 | 22 | 23 | 24 | 25 |
| Proprietary blend of alkoxylated $C_{14-15}$ linear alcohols | 25 | 20 | 20 | 25 | 20 | 20 | 25 | 20 | 20 | 15 | 15 | 15 |
| Proprietary fatty acid | — | — | 2 | — | — | 2 | — | — | 3 | 2 | 2 | 1 |
| Proprietary blend of linear $C_{10}$–$C_{14}$ alpha-olefins | 4 | 4 | 4 | 4 | 4 | 4 | 4 | 4 | 4 | 4 | 4 | 4 |
| MeOH | 41 | 46 | 44 | 42 | 47 | 45 | 43 | 48 | 45 | 50 | 49 | 49 |
| Propargyl alcohol | 6 | 6 | 6 | 6 | 6 | 6 | 6 | 6 | 6 | 6 | 6 | 6 |

TABLE V

Preparation of Products Containing Propargyl Alcohol and/or Iodine

| Ingredients (pbw) | 2M | 2N | 2O | 2P | 2Q | 2R |
|---|---|---|---|---|---|---|
| Mannich Base | 24 | 23 | 22 | 50 | — | — |
| Proprietary blend of alkoxylated $C_{14-15}$ linear alcohols | — | — | — | 13 | 9 | 9 |
| Proprietary fatty acid | — | — | — | — | 3 | 3 |
| Proprietary blend of linear $C_{10}$–$C_{14}$ alpha-olefins | — | — | — | — | 4 | 4 |
| MeOH | — | — | — | — | 46 | 46 |
| Propargyl alcohol | 6 | 6 | 6 | — | 6 | 6 |
| Iodine | — | — | — | 2 | — | — |
| Compound 2P | — | — | — | — | 32 | 32 |

TABLE VI

Preparation of Products Containing Propargyl Alcohol and/or Iodine

| Ingredients (pbw) | $2b_1$ | 2S | $2a_1$ | $2c_1$ | $2d_1$ | $2e_1$ |
|---|---|---|---|---|---|---|
| Mannich Base | — | — | — | 75 | — | — |
| Proprietary blend of alkoxylated $C_{14-15}$ linear alcohols | 9 | 9 | 9 | 19.5 | 9 | 9 |
| Proprietary fatty acid | 3 | 3 | 3 | — | 3 | 3 |
| Proprietary blend of linear $C_{10}$–$C_{14}$ alpha-olefins | 4 | 4 | 4 | — | 4 | 4 |
| MeOH | 46 | 46 | 46 | — | 46 | 46 |
| Propargyl alcohol | 6 | 6 | 6 | — | 6 | 6 |
| Compound $2c_1$ | — | — | — | — | 32 | 32 |
| Compound 2P | 32 | 32 | 32 | — | — | — |
| Iodine | — | — | — | 3 | — | — |
| Heating (2 hr) and mixing, hr: | 7 | 2 | 5 | 5 | — | 1 |

The preparation for Compound $2c_1$ involved heating the Mannich Base with the iodine for 1 hour, then adding the proprietary alkoxylated $C_{14-15}$ linear alcohols and heating for 4 hours.

COMPOUNDS 3A–3F

The indicated amounts of alcohol and other components were mixed together as indicated in Table VII to test for low temperature stability.

TABLE VII

Preparation of Iodine-Containing Products

| Ingredients (pbw) | 3A | 3B | 3C | 3D | 3E | 3F |
|---|---|---|---|---|---|---|
| Mannich Base | 25 | 25 | 25 | 25 | 25 | 25 |
| Proprietary blend of alkoxylated $C_{14-15}$ linear alcohols | 15 | 15 | 15 | 15 | 15 | 21 |
| Proprietary fatty acid | 3 | 3 | 3 | 3 | 3 | 3 |
| Proprietary blend of linear $C_{10}$–$C_{14}$ alpha-olefins | 4 | 4 | 4 | 4 | 4 | 4 |
| Propargyl alcohol | 6 | 6 | 6 | — | — | — |
| Compound J | — | — | — | 7 | 7 | 7 |
| MeOH | 42 | 37 | 32 | 41 | 36 | 31 |
| IPA | 5 | 10 | 15 | 5 | 10 | 15 |

Compounds 3A–3F were placed in a freezer for 28 hours to test low temperature stability. All Compounds, including inventive compounds 3D, 3E, and 3F were excellent.

Additional Corrosion Inhibition Examples 13–16 were conducted according to the same procedure as Examples 1–6, again using formic acid as an intensifier. Results are summarized in Table VIII and demonstrate that inventive compound 2Q gives excellent results.

TABLE VIII

EXAMPLES 13–16
Demonstration of Corrosion Inhibition Effect
6 hours at 250° F.; 100 ml; 15% HCl; 4000 psig

| Ex. No. | Compound | Conc. GPT | Formic GPT | Steel | Wt. Loss, lb/ft² | Remarks |
|---|---|---|---|---|---|---|
| 13 | 2Q | 10 | — | J-55 | 0.015 | 1 |
| 14 | " | 10 | — | Cr13 | 0.024 | 1 |
| 15 | " | 10 | 10 | J-55 | 0.013 | 1 |
| 16 | " | 10 | 10 | Cr13 | 0.013 | 1 |

Additional Corrosion Inhibition Examples 17–26 were conducted according to the same procedure as Examples 1–6, except that no intensifier was used. Results are summarized in Table IX.

TABLE IX

EXAMPLES 17–26
Demonstration of Corrosion Inhibition Effect
6 hours at 250° F.; 100 ml; 15% HCl; 4000 psig

| Ex. No. | Compound | Conc. GPT | Steel | Wt. Loss. lbs/ft² | Remarks |
|---|---|---|---|---|---|
| 17 | 2Q | 10 | J-55 | 0.026 | 4,1 |
| 18 | " | 10 | Cr13 | 0.043 | 4,1 |
| 19 | 2R | 10 | J-55 | 0.024 | 1 |
| 20 | " | 10 | Cr13 | 0.062 | 4,3 |
| 21 | 2S | 10 | J-55 | 0.022 | 1 |
| 22 | " | 10 | Cr13 | 0.042 | 4,1 |
| 23 | $2a_1$ | 10 | J-55 | 0.021 | 1 |
| 24 | " | 10 | Cr13 | 0.038 | 4,3 |
| 25 | $2b_1$ | 10 | J-55 | 0.021 | 1 |
| 26 | " | 10 | Cr13 | 0.037 | 4,3 |

Additional Corrosion Inhibition Examples 27–34 were conducted according to the same procedure as Examples 1–6, formic acid was used as an intensifier. Results are summarized in Table X. All compounds are inventive.

TABLE X

EXAMPLES 27–34
Demonstration of Corrosion Inhibition Effect
6 hours at 250° F.; 100 ml; 15% HCl; MSO; 4000 psig

| Ex. No. | Compound | Conc. GPT | Formic GPT | Steel | Wt. Loss, lbs/ft² | Remarks |
|---|---|---|---|---|---|---|
| 27 | 2R | 10 | 10 | J-55 | 0.029 | 4 |
| 28 | " | 10 | 10 | Cr13 | 0.022 | 4 |
| 29 | G | 10 | 10 | J-55 | 0.066 | 4 |
| 30 | " | 10 | 10 | Cr13 | 0.027 | 4 |
| 31 | H | 10 | 10 | J-55 | 0.022 | 4 |
| 32 | " | 10 | 10 | Cr13 | 0.019 | 2 |
| 33 | I | 10 | 10 | J-55 | 0.021 | 4 |
| 34 | " | 10 | 10 | Cr13 | 0.020 | 2 |

Additional Corrosion Inhibition Examples 35–40 were conducted according to the same procedure as Examples 1–6, except that no intensifier was used. Results are summarized in Table XI. All compounds are inventive.

TABLE XI

EXAMPLES 35–40
Demonstration of Corrosion Inhibition Effect
6 hours at 250° F.; 100 ml; 15% HCl; MSO; 4000 psig

| Ex. No. | Compound | Conc. GPT | Steel | Wt. Loss. lbs/ft² | Remarks |
|---|---|---|---|---|---|
| 35 | 2R | 10 | Cr13 | 0.055 | 4 |
| 36 | " | 10 | J-55 | 0.025 | 1 |
| 37 | G | 15 | Cr13 | 0.054 | 5 |
| 38 | " | 15 | J-55 | 0.023 | 1 |
| 39 | K | 10 | Cr13 | 0.053 | 5 |
| 40 | " | 15 | J-55 | 0.023 | 1 |

Additional Corrosion Inhibition Examples 41–48 were conducted according to the same procedure as Examples 1–6, except that no intensifier was used. Results are summarized in Table XII. All compounds are inventive.

TABLE XII

EXAMPLES 41–48
Demonstration of Corrosion Inhibition Effect
6 hours at 250° F.; 100 ml; 15% HCl; MSO; 4000 psig

| Ex. No. | Compound | Conc. GPT | Steel | Wt. Loss, lbs/ft$^2$ | Remarks |
|---|---|---|---|---|---|
| 41 | H | 10 | Cr13 | 0.056 | 4 |
| 42 | " | 10 | J-55 | 0.034 | 5 |
| 43 | " | 15 | Cr13 | 0.043 | 2 |
| 44 | " | 15 | J-55 | 0.021 | 1 |
| 45 | I | 10 | Cr13 | 0.067 | 4 |
| 46 | " | 10 | J-55 | 0.025 | 4 |
| 47 | " | 15 | Cr13 | 0.047 | 4 |
| 48 | " | 15 | J-55 | 0.022 | 1 |

Additional Corrosion Inhibition Examples 49–60 were conducted according to the similar procedure as Examples 7–12. All Examples used J-55 steel coupons. Results are summarized in Table XIII.

TABLE XIII

EXAMPLES 49–60
Demonstration of Corrosion Inhibition Effect
6 hours at 200° F.; 100 ml; 28% HCl; atmospheric

| Ex. No. | Compound | Conc. GPT | Wt. Loss, lbs/ft$^2$ | Remarks |
|---|---|---|---|---|
| 49 | 2C | 25 | 0.012 | 1 |
| 50 | " | 20 | 0.013 | 1 |
| 51 | 2F | 25 | 0.013 | 1 |
| 52 | " | 20 | 0.016 | 1 |
| 53 | 2I | 25 | 0.014 | 1 |
| 54 | " | 20 | 0.021 | 1 |
| 55 | 2J | 25 | 0.010 | 1 |
| 56 | " | 20 | 0.013 | 1 |
| 57 | 2K | 25 | 0.009 | 1 |
| 58 | " | 20 | 0.012 | 1 |
| 59 | 2L | 25 | 0.011 | 1 |
| 60 | " | 20 | 0.013 | 1 |

Additional Corrosion Inhibition Examples 61–67 were conducted according to the similar procedure as Examples 7–12. All Examples used J-55 steel coupons. Results are summarized in Table XIV.

TABLE XIV

EXAMPLES 61–67
Demonstration of Corrosion Inhibition Effect
6 hours at 200° F.; 100 ml; 28% HCl; atmospheric

| Ex. No. | Compound | Conc. GPT | Wt. Loss, lbs/ft$^2$ | Remarks |
|---|---|---|---|---|
| 61 | M | 18 | 0.025 | 1 |
| 62 | 2C | 18 | 0.015 | 1 |
| 63 | 2F | 18 | 0.016 | 1 |
| 64 | 2I | 18 | 0.014 | 1 |
| 65 | 2J | 18 | 0.012 | 1 |
| 66 | 2K | 18 | 0.011 | 1 |
| 67 | 2L | 18 | 0.011 | 1 |

Additional Corrosion Inhibition Examples 68–71 were conducted according to the similar procedure as Examples 7–12. All Examples used J-55 steel coupons. Results are summarized in Table XV. Inventive compound 2Q gave better weight loss and observational results than comparative compound M which employed propargyl alcohol, but no iodine.

TABLE XV

EXAMPLES 68–71
Demonstration of Corrosion Inhibition Effect
6 hours at 200° F.; 100 ml; 28% HCl; atmospheric

| Ex. No. | Compound | Conc. GPT | Wt. Loss, lbs/ft$^2$ | Remarks |
|---|---|---|---|---|
| 68 | M | 14 | 0.036 | 2 |
| 69 | 2Q | 16 | 0.009 | 1 |
| 70 | " | 14 | 0.009 | 1 |
| 71 | " | 12 | 0.011 | 1 |

Additional Corrosion Inhibition Examples 72–79 were conducted according to the similar procedure as Examples 7–12. The type of the steel coupons used is indicated. Results are summarized in Table XVI. Again, inventive compound 2Q gave better weight loss and observational results than comparative compound M.

TABLE XVI

EXAMPLES 72–79
Demonstration of Corrosion Inhibition Effect
6 hours at 200° F.; 100 ml; 28% HCl; atmospheric

| Ex. No. | Compound | Conc. GPT | Steel | Wt. Loss, lbs/ft$^2$ | Remarks |
|---|---|---|---|---|---|
| 72 | M | 10 | J-55 | 0.072 | 2 |
| 73 | 2Q | 10 | " | 0.011 | 1 |
| 74 | " | 8 | " | 0.019 | 2 |
| 75 | " | 6 | " | 0.039 | 2 |
| 76 | M | 10 | Cr-13 | 0.379 | 6 |
| 77 | 2Q | 10 | " | 0.017 | 1 |
| 78 | " | 8 | " | 0.035 | 4 |
| 79 | " | 6 | " | 0.166 | 5 |

Additional Corrosion Inhibition Examples 80–87 were conducted according to the similar procedure as Examples 7–12. The type of the steel coupons used is indicated. Results are summarized in Table XVII. All compounds were inventive.

TABLE XVII

EXAMPLES 80–87
Demonstration of Corrosion inhibition Effect
6 hours at 200° F.; 100 ml; 28% HCl; atmospheric

| Ex. No. | Compound | Conc. GPT | Steel | Wt. Loss, lbs/ft$^2$ | Remarks |
|---|---|---|---|---|---|
| 80 | 2R | 8 | J-55 | 0.014 | 1 |
| 81 | " | 8 | Cr-13 | 0.050 | 3 |
| 82 | G | 8 | J-55 | 0.011 | 1 |
| 83 | " | 8 | Cr-13 | 0.026 | 2 |
| 84 | H | 8 | J-55 | 0.018 | 1 |
| 85 | " | 8 | Cr-13 | 0.072 | 4 |
| 86 | I | 8 | J-55 | 0.025 | 1 |
| 87 | " | 8 | Cr-13 | 0.103 | 4 |

Many modifications may be made in the present invention without departing from the spirit and scope thereof which are defined only by the appended claims. For example, certain components per se, or combinations of components thereof other than those specifically set out herein may be found by one of routine skill in the art to be particularly advantageous. Additionally, certain proportions of components may produce reaction products or proportions of reaction products having particular efficacy.

GLOSSARY

Mannich Base
A Mannich base made in accordance with U.S. Pat. No. 3,077,454, incorporated by reference herein.

Ox 781
15 moles ethylene oxide reaction product with nonylphenol

We claim:

1. A method for inhibiting the corrosion of metals in contact with an acidic liquid medium comprising:
   providing a liquid medium containing an acid which is in contact with metal(s), and adding to the liquid medium an effective amount of a corrosion inhibitor comprising a reaction product of iodine and propargyl alcohol, wherein the reaction product is made from about 6:1 to about 4:1.5 parts by weight of propargyl alcohol to parts by weight of iodine.

2. The method of claim 1 where an effective amount of the reaction product in the corrosion inhibitor ranges from about 1 to about 20 gallons per thousand gallons (gpt) based on the amount of acid.

3. The method of claim 1 where the reaction product is 2,3di-iodo-2-propen-1-ol having the formula:

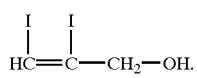 (I)

4. The method of claim 1 where the acid in the liquid medium is selected from the group consisting of hydrochloric add, hydrofluoric acid, formic acid, acetic acid, and mixtures thereof.

5. The method of claim 1 where the acid in the liquid medium is selected from the group consisting of hydrochloric acid, hydrofluoric acid, and mixtures thereof.

6. The method of claim 1 where the amount of the reaction product in the corrosion inhibitor ranges from about 1 to about 100 parts by weight based on 100 parts by weight of the corrosion inhibitor.

7. A method for inhibiting the corrosion of metals in contact with an acidic liquid medium comprising:
   providing a liquid medium containing an acid which is in contact with metal(s), and
   adding to the liquid medium an effective amount of a corrosion inhibitor comprising a reaction product of iodine and propargyl alcohol where the reaction product is 2,3-di-iodo-2-propen-1-ol having the formula:

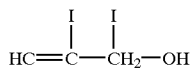 (I)

where the amount of the reaction product in the corrosion inhibitor ranges from about 1 to about 100 parts by weight, based on 100 parts by weight of the corrosion inhibitor, and where the reaction product is made from about 6:1 to about 4:1.5 parts by weight of propargyl alcohol to parts by weight of iodine.

8. The method of claim 7 where an effective amount of reaction product in the corrosion inhibitor ranges from about 1 to about 20 gallons per thousand gallons (gpt) based on the amount of acid.

9. The method of claim 7 where the acid in the liquid medium is selected from the group consisting of hydrochloric acid, hydrofluoric acid, formic acid, acetic acid, and mixtures thereof.

10. A method for inhibiting the corrosion of metals in contact with an acidic liquid medium comprising:
    providing a liquid medium containing an acid which is in contact with metal(s) where the acid is selected from the group consisting of hydrochloric acid, hydrofluoric acid, formic acid, acetic acid and mixtures thereof, and
    adding to the liquid medium an effective amount of a corrosion inhibitor comprising a reaction product of iodine and propargyl alcohol where the reaction product is 2,3-di-iodo-2-propen-1-ol having the formula:

 (I)

where the amount of the reaction product in the corrosion inhibitor ranges from about 1 to about 100 parts by weight, based on 100 parts by weight of the corrosion inhibitor, and where the reaction product is made from about 6:1 to about 4:1.5 parts by weight of propargyl alcohol to parts by weight of iodine.

11. The method of claim 10 where an effective amount of reaction product in the corrosion inhibitor ranges from about 1 to 20 gallons per thousand gallons (gpt) based on the amount of acid.

* * * * *

UNITED STATES PATENT AND TRADEMARK OFFICE
CERTIFICATE OF CORRECTION

PATENT NO.   : 6,511,613 B1
DATED        : January 28, 2003
INVENTOR(S)  : Arthur Cizek and James A. Hackerott It is certified that error appears in the above-identified patent and that said Letters Patent is hereby corrected as shown below:

<u>Column 3,</u>
Line 5, please delete the word "pargyl" and replace with -- propargyl --.

<u>Column 14,</u>
Line 5, please delete current compound:

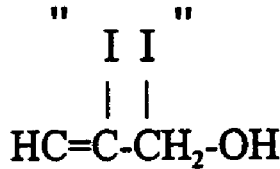

and replace with

Line 35, please delete current compound:

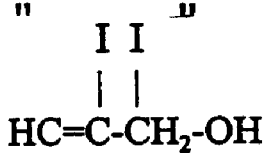

and replace with

Signed and Sealed this

Seventeenth Day of June, 2003

JAMES E. ROGAN
*Director of the United States Patent and Trademark Office*